US008004535B2

(12) United States Patent
Blaukopf et al.

(10) Patent No.: US 8,004,535 B2
(45) Date of Patent: Aug. 23, 2011

(54) APPARATUS AND METHOD FOR SELECTIVELY DOUBLE BUFFERING PORTIONS OF DISPLAYABLE CONTENT

(75) Inventors: Jacob Benjamin Blaukopf, Cambridge (GB); Nicholas Carl Brook, Cambridge (GB); Stefan Geoffrey Butlin, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 1100 days.

(21) Appl. No.: 11/755,732

(22) Filed: May 30, 2007

(65) Prior Publication Data

US 2007/0291037 A1 Dec. 20, 2007

Related U.S. Application Data

(60) Provisional application No. 60/803,633, filed on Jun. 1, 2006.

(51) Int. Cl.
*G09G 5/399* (2006.01)
*G06F 13/00* (2006.01)

(52) U.S. Cl. ........................................ 345/539; 345/536

(58) Field of Classification Search .................. 345/538, 345/539, 545
See application file for complete search history.

(56) References Cited

U.S. PATENT DOCUMENTS

| | | | | |
|---|---|---|---|---|
| 5,742,788 | A * | 4/1998 | Priem et al. | 711/110 |
| 5,850,232 | A | 12/1998 | Engstrom et al. | |
| 6,380,935 | B1 * | 4/2002 | Heeschen et al. | 345/423 |
| 6,900,813 | B1 * | 5/2005 | Stefanidis | 345/562 |
| 7,184,059 | B1 * | 2/2007 | Fouladi et al. | 345/604 |
| 7,262,776 | B1 * | 8/2007 | Wilt et al. | 345/539 |
| 2002/0085013 | A1 | 7/2002 | Lippincott | |
| 2004/0179019 | A1 * | 9/2004 | Sabella et al. | 345/537 |

FOREIGN PATENT DOCUMENTS

| | | |
|---|---|---|
| AU | 739491 | 10/2001 |
| WO | WO9610245 | 4/1996 |

* cited by examiner

*Primary Examiner* — Kee M Tung
*Assistant Examiner* — Jacinta Crawford
(74) *Attorney, Agent, or Firm* — Fariba Yadegar-Bandari

(57) ABSTRACT

A method of generating displayable content is provided. The method includes obtaining a display package having a plurality of display elements defining a plurality of display frames. The method further includes rendering at least one selected group of the plurality of display elements. Each selected group is based on indicator information in the display package and comprises less than all of the plurality of display elements. Further included is saving a copy of each rendered selected group in a second display buffer. The method further includes rendering at least one display frame within the plurality of display frames such that at least a portion of the at least one rendered display frame comprises the saved copy of at least one rendered selected group. Further included is saving the at least one rendered display frame in a first display buffer that is different from the second display buffer.

49 Claims, 5 Drawing Sheets

APPARATUS AND METHOD FOR SELECTIVELY DOUBLE BUFFERING PORTIONS OF DISPLAYABLE CONTENT

CLAIM OF PRIORITY UNDER 35 U.S.C. §119

The present Application for Patent claims priority to Provisional Application No. 60/803,633 entitled "APPARATUS AND METHOD FOR SELECTIVELY DOUBLE BUFFERING PORTIONS OF DISPLAYABLE CONTENT" filed Jun. 1, 2006, and assigned to the assignee hereof and hereby expressly incorporated by reference herein in its entirety.

BACKGROUND

The described aspects relate to buffering of content to be presented on a display, and more particularly, to an apparatus, method, and computer program product for selectively double buffering portions of the displayable content.

Many computer devices, such as a wireless communication device, include a display screen operable to present a display frame, or visible image on the screen. Since many computer devices redraw the visible display frame, it can be difficult to make changes to the display frame without the display screen showing the results before the completion of the graphics operation. This results in undesirable artifacts, such as flickering, tearing and shearing. Overcoming such undesirable artifacts can be achieved by using display buffers, also known as double or secondary buffers. The display screen has a display buffer into which the display frame is rendered prior to being copied to the display memory, which directly affects what is presented on the screen. The secondary or double buffer may be utilized for the construction of new display frames. Any rendering of displayable content into the secondary buffer, referred to as double buffering, can not affect the display screen. When the construction of a new display frame in the secondary buffer is complete, then the newly constructed display frame can be copied, or "blitted," into the display memory using an efficient buffer copy routine. Thus, through the use of a buffer, the presence of artifacts in the visible display frame presented on the display screen can be reduced or eliminated.

In some systems, the entire display screen is double buffered, i.e. all the components are located in one buffer. In other systems, element-by-element double buffering occurs, in which each individual displayable element is first rendered to its own private buffer before that buffer is copied to the screen's double buffer.

In computer devices having limited resources, however, the advantage of improved quality of the visible display frame provided by double buffering can be weighed against the cost in terms of memory requirement and processor usage.

Thus, improved apparatus and methods for buffering displayable content are desired.

SUMMARY

Apparatus, methods, and computer program product are described for selectively double buffering at least one selected group of a plurality of display elements in a display package of a plurality of display frames. The apparatus and methods further include generating less than the entirety of at least one display frame using the double buffered rendered selected group.

In one aspect, a method of generating displayable content is provided. The method comprises obtaining a display package having a plurality of display elements defining a plurality of display frames. The method further includes rendering at least one selected group of the plurality of display elements. Each selected group is based on indicator information in the display package and each selected group comprises less than all of the plurality of display elements. The method further includes saving a copy of each rendered selected group in a second display buffer. Further, the method includes rendering at least one display frame within the plurality of display frames such that at least a portion of the at least one rendered display frame comprises the saved copy of at least one rendered selected group. Additionally, the method includes saving the at least one rendered display frame in a first display buffer. The first display buffer is different from the second display buffer.

In another aspect, at least one processor configured to generate displayable content comprising having one or more modules is provided. The processor includes a module operable to obtain a display package, a module operable to render at least one selected group of the plurality of display elements, and a module operable to save a copy of each rendered selected group in a second display buffer. The display package has a plurality of display elements defining a plurality of display frames. Each selected group is based on indicator information in the display package and each selected group comprises less than all of the plurality of display elements. The processor further includes a module operable to render at least one display frame within the plurality of display frames such that at least a portion of the at least one rendered display frame comprises the saved copy of at least one rendered selected group. The processor further includes a module operable to save the at least one rendered display frame in a first display buffer. The first display buffer is different from the second display buffer.

In a further aspect, a computer program product comprising a computer-readable medium having instructions is provided. The computer-readable medium includes at least one instruction for causing a computer to obtain a display package having a plurality of display elements defining a plurality of display frames. The computer-readable medium further includes at least one instruction for causing the computer to render at least one selected group of the plurality of display elements. Each selected group is based on indicator information in the display package and each selected group comprises less than all of the plurality of display elements. Further included in the computer-readable medium is at least one instruction for causing the computer to save a copy of each rendered selected group in a second display buffer. Additionally, the computer-readable medium includes at least one instruction for causing the computer to render at least one display frame within the plurality of display frames such that at least a portion of the at least one rendered display frame comprises the saved copy of at least one rendered selected group. The computer-readable medium further includes at least one instruction for causing the computer to save the at least one rendered display frame in a first display buffer. The first display buffer is different from the second display buffer.

In another aspect, an apparatus is provided. The apparatus includes means for obtaining a display package having a plurality of display elements defining a plurality of display frames and means for rendering at least one selected group of the plurality of display elements. Each selected group is based on indicator information in the display package and each selected group comprises less than all of the plurality of display elements. The apparatus further includes means for saving a copy of each rendered selected group in a second display buffer and means for rendering at least one display frame within the plurality of display frames such that at least a portion of the at least one rendered display frame comprises the saved copy of at least one rendered selected group. Further included in the apparatus is means for saving the at least one rendered display frame in a first display buffer. The first display buffer is different from the second display buffer.

In an additional aspect, a computer device for generating displayable content comprises a memory comprising a first display buffer, a second display buffer different from the first display buffer, and a display package. The display package comprises a plurality of display elements defining a plurality of display frames. The computer device also comprises a processor in communication with the memory, and a rendering module having rendering logic. The rendering module is executable by the processor to render at least one selected group of the plurality of display elements. Each selected group is based on indicator information in the display package, and each selected group comprises less than all of the plurality of display elements. Further, the rendering module is executable by the processor to save a copy of each rendered selected group in the second display buffer. Additionally, the rendering module is further executable by the processor to render at least one display frame within the plurality of display frames such that at least a portion of the at least one rendered display frame comprises the saved copy of at least one rendered selected group. Additionally, the rendering module is further executable by the processor to save the at least one rendered display frame in the first display buffer.

DETAILED DESCRIPTION

The described apparatus, methods, and computer program product relate to the generation of graphics on a display of a device. Each graphic or display frame may comprise a plurality of displayable elements. Depending on the nature of any one or a group of the displayable elements, trade-offs can be made between newly rendering each element for each display frame, or storing one or more previously-rendered elements and combining a copy of the previously-rendered elements with the remaining elements to form the display frame. In the subject application, the operation of storing and then copying the previously-rendered one or group of element(s) is referred to as double buffering. The described aspects provide a mechanism and a framework for selectively identifying one or more individual display elements, and/or one or more groups of individual display elements, for double buffering. The described aspects further provide a mechanism and framework for generating, storing, and presenting rendered display frames based on a combination of the one or more double buffered elements and remaining non-double buffered elements.

As used herein, the word "exemplary" means "serving as an example, instance, or illustration." Any aspect described herein as "exemplary" is not necessarily to be construed as preferred or advantageous over other aspects.

Figure 1:
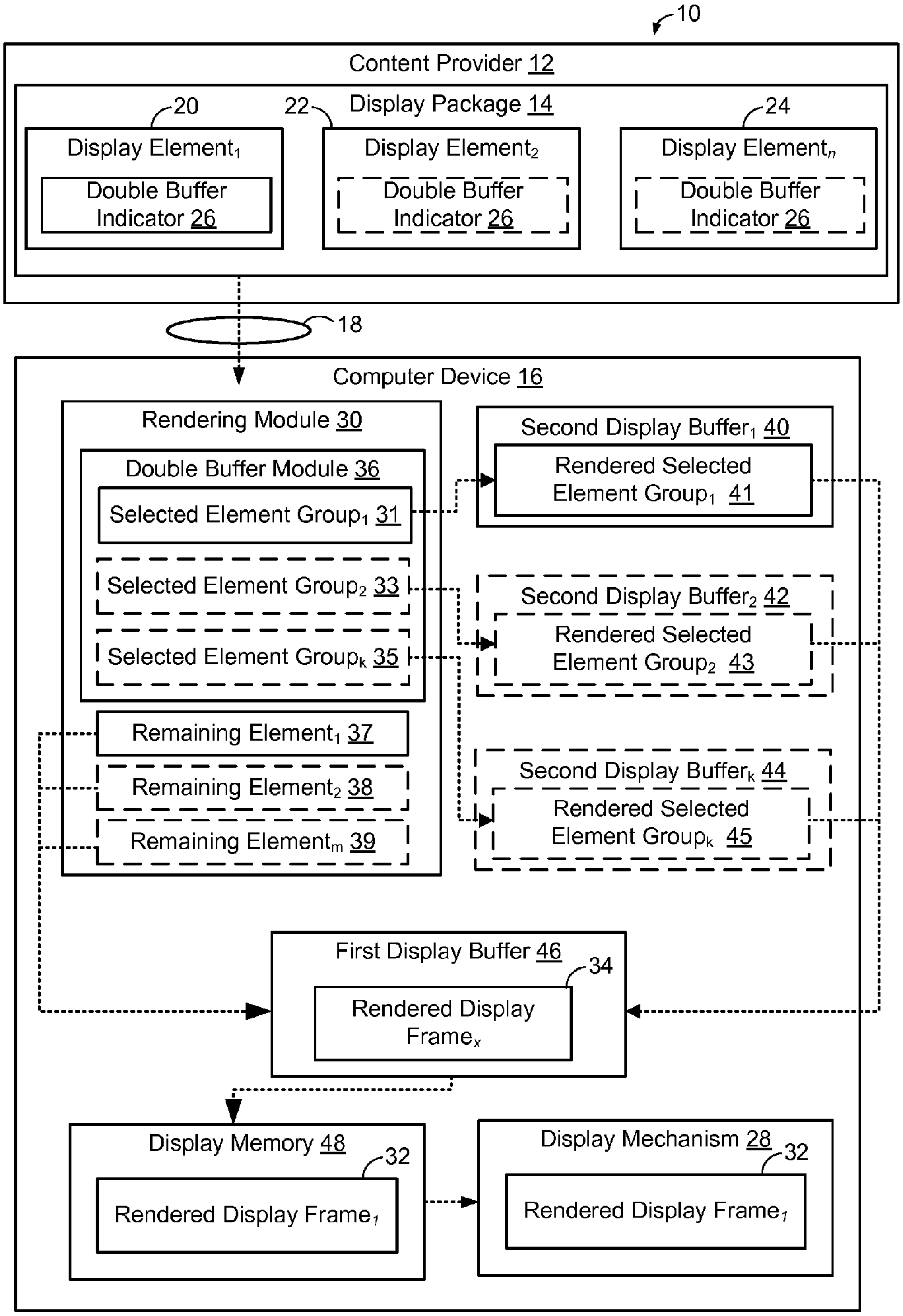
FIG. 1 is a schematic diagram of one aspect of a system for generating displayable content.

Referring to FIG. 1, an exemplary system 10 operable to generate displayable content is depicted, according to one implementation. The system 10 comprises at least one content provider 12 supplying a display package 14 of displayable content to a computer device 16 via a communication interface 18. Display package 14 may comprise any number, n, of display elements 20, 22, and 24, where n is a positive integer. The display elements 20, 22, and 24 may define a plurality of display frames that form a graphic user interface which may be changeable over time. Each of display elements 20, 22 and 24 may define at least an element to present within a display frame, when to present a display element in a display frame, when to present each display frame (e.g. a frame rate), where to present a display element in a display frame, and how to present a display element in a display frame. In one aspect, display package 14 may comprise a frame rate defined in some other manner, rather than by being defined by one or more respective display elements.

Additionally, display package 14 may comprise at least one double buffer indicator 26 operable to cause selective double buffering of content, including one or any combination of display elements 20, 22 and 24. In one implementation, double buffer indicator 26 may include, but is not limited to, information contained within, or associated with one or more display elements 20, 22, and 24. For example, in one aspect, double buffer indicator 26 may comprise one or any combination of a tag, a command, a marker, a characteristic and/or composition associated with all or some portion of one or more display elements, a data structure, and/or any other mechanism recognizable within the framework of display package operable to selectively enable double buffering. According to one implementation, an author of display package 14 may input double buffer indicator 26. In another aspect, double buffer indicator 26 may be derived from all or some portion of display package 14 and/or all or some portion of one or more display elements 20, 22, and 24. As such, in one aspect, double buffer indicator 26 may not be a discrete component of display package 14. Rather, the double buffer indicator 26 may be a function of the combination of display elements 20, 22 and 24 in display package 14.

Further, computer device 16 comprises a display mechanism 28 in communication with a rendering module 30 operable to receive display package 14. Responsive to receipt of display package 14, rendering module 30 may be operable to generate a plurality of x rendered display frames 32 and 34 on display mechanism 28, where x is a positive integer. The plurality of rendered display frames 32 and 34 can be defined by display package 14 and one or any combination of display elements 20, 22 and 24. Thus, rendering module 30 may be operable to generate and control the presentation on display mechanism 28 of a graphic user interface which is changeable over time.

Additionally, computer device 16 can further comprise a double buffer module 36 operable to identify any number from 1 to k of selected element group(s) 31, 33, and 35, where k is a positive integer. The selected element groups 31, 33, and 35 may be from the plurality of display elements 20, 22 and 24 for double buffering based on the double buffer indicator 26. It should be noted that each of selected element group(s) 31, 33, and 35 may include a single one or any combination of the plurality of display elements 20, 22 and 24. In one aspect, however, any of selected element groups 31, 33, and 35 may comprise less than all of the respective ones of the plurality of display elements 20, 22 and 24 associated with a respective one of the plurality of rendered display frames 32 and 34. In other words, in such an aspect, for a given display frame 32 and/or 34, any one selected element group can contain less than the total number of display elements used to paint the respective display frame.

As such, based on the operation of double buffer module 36 with respect to display package 14, rendering module 30 may be operable to generate a rendered selected element group from each selected element group. For instance, rendered selected element groups 41, 43 and 45 have respectively been generated from selected element groups 31, 33 and 35. Further, in one aspect, rendering module 30 may be operable to store each respective rendered selected element group 41, 43, and 45 in a separate, defined portion of device memory thus defining a separate double buffer (e.g., second display buffers 40, 42, and 44).

As a result, rendering module 30 may further be operable to generate a portion of at least one rendered display frame 34 using one or any combination of rendered selected element groups 41, 43, and 45. In such an implementation, the portion of the at least one rendered display frame comprises less than the entirety of the display frame. For example, in one aspect, rendered display frame 34 may be formed from any remaining display element(s) 37, 38, and/or 39 from the plurality of display elements 20, 22 and 24 in combination with a copy of the one or more rendered selected element group(s) 31, 33, and/or 35. In the subject example, any remaining display element(s) 37, 38 and/or 39 may range from 0 to m display elements, where m is a positive integer. Additionally, as used herein, any remaining display elements may include any display element used within a given display frame which may not have been included in a selected element group. In another aspect, rendered display frame 34 may be formed entirely from any of the plurality of rendered selected element groups 41, 43 and 45.

Further, in one implementation, rendering module 30 may be operable to store rendered display frame 34 in another defined portion of device memory, such as a first display buffer 46. First display buffer 46 allows rendering module 30 to construct or paint a new display frame without substantially affecting the presentation of the current display frame. Additionally, in one aspect, rending module 30 may be operable to copy rendered display frame 34 into a further defined portion of memory, such as display memory 48 presented on display mechanism 28. As such, the content of display memory 48 can directly affect the content of the presented display frame.

Rendering module 30 may further be operable to generate and control the presentation of the plurality of rendered display frames 32 and 34 corresponding to display package 14 (e.g., generate a user interface on computer device 16, etc.) on display mechanism 28. In particular, a portion of at least one rendered display frame may be formed from a combination of one or more previously-rendered or double buffered element (s) or group(s) of elements, as identified by double buffer module 36. Further, the entire rendered display frame 34 may be formed from either (1) one or more previously-rendered element(s)/groups(s) and one or more newly rendered element(s)/group(s), or (2) a plurality of previously-rendered elements/groups. Therefore, as the one or more previously-rendered element(s)/group(s) do not have to be re-rendered for presentation in the given display frame, some aspects of system 10 operate to provide selective double buffering of portions of the displayable content, resulting in increased rendering speed and efficiency.

Figure 2:
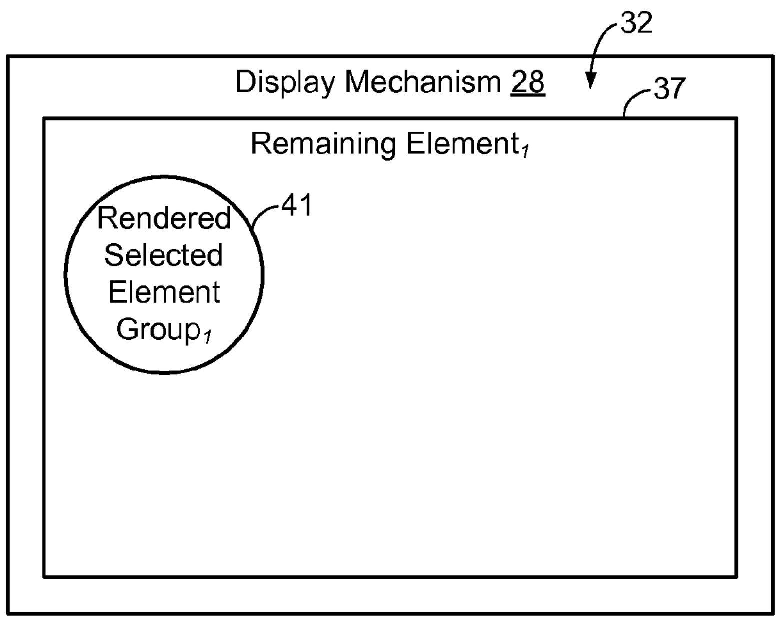
FIG. 2 is a block diagram of one aspect of a first-in-time rendered display frame of the system of FIG. 1 wherein the first-in-time rendered display frame comprises the combination of a previously-rendered selected element group chosen from a plurality of display elements, and the remaining element(s) from the plurality of display elements.
Figure 3:
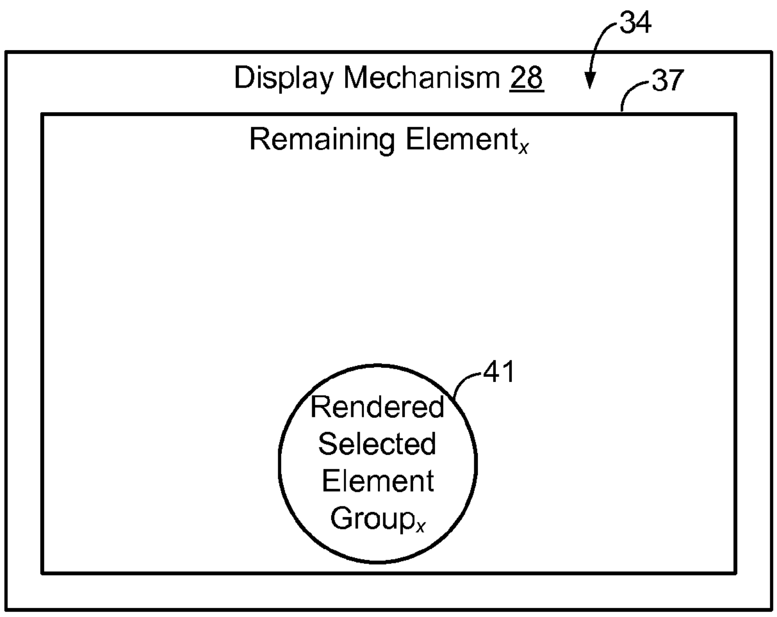
FIG. 3 is a block diagram of one aspect of a second-in-time rendered display frame of the system of FIG. 1 wherein the second-in-time rendered display frame comprises the combination of a previously-rendered selected element group chosen from a plurality of display elements, and the remaining element(s) from the plurality of display elements, wherein the only change in the previously-rendered selected element group is its relative position with respect to the remaining display element(s)

Referring to FIGS. 2 and 3, in an example of one scenario, double buffer indicator 26 may be associated with selected element group 31 (FIG. 1) when the corresponding rendered selected element group 41 has not been changed from one rendered display frame at time 1 to another rendered display frame at time x, where x is any time after time 1 (e.g., from frame 32 to frame 34). In this scenario, only the position of rendered selected element group 41 may change relative to remaining element 37, thereby changing rendered display frame 34 with respect to rendered display frame 32.

In one aspect, system 10 can optimize the generation of a rendered display frame. Optimization can be achieved by allowing for the analysis of display package 14 (FIG. 1) and the plurality of display frames, and determining whether one or more display elements have static compositions. Further, in one aspect, system 10 may allow for weighing the costs and benefits of double buffering the identified one or more groups of static display elements. The costs and benefits to be considered can include the amount of memory used for double buffering the content as well as the processing time saved by copying rendered content rather than re-rendering the content, while considering the frame rate of the display frames. In one implementation, such analysis may occur manually upon creating, testing, and/or using display package 14. In another aspect, such analysis may occur automatically based on one or any combination of rules, functions, heuristics, neural networks, and/or any other predetermined logic, such as rendering logic 56 (FIG. 5) and double buffer logic 58 (FIG. 4) as discussed below, within rendering module 30 and/or double buffer module 36.

Referring back to FIG. 1, as noted earlier, display package 14 may comprise a plurality of display elements 20, 22, and 24. Each display element 20, 22, and 24 may comprise all or a portion of a displayed component, wherein at least one displayed component defines each display frame. In particular, in one aspect where display package 14 comprises a markup language such as extensible markup language (XML), each display element 20, 22, and 24 may comprise any single markup language element or any group of markup language elements. Additionally, in one implementation, display elements 20, 22 and 24 may be provided within display package 14 in a tree-based structure, a nesting structure, and/or any other structure that allows for a hierarchy of data.

In one aspect, for example, display package 14 may be operable to define a user interface (UI) for computer device 16 in one or any combination of: a first data format, such as a non-compiled data file; a second data format, such as a compiled data file or object file; and, a programming language. For example, display package 14 may include, but is not limited to a markup language document, such as a TrigML™ document. A TrigML™ document is an XML-derived UT mark-up language document tailored to the requirements of devices with small screen areas, limited memory and limited processing power (e.g. configured for computer device 16 having a predetermined display characteristic, a predetermined amount of memory 66, and a predetermined capability of processor 68); an XML document; a hypertext markup language (HTML) document; and a scripting programming language file (e.g., a JavaScript™ file, etc.).

Further, display package 14 provides the rendering framework into which double buffer indicator 26 may be inserted or from which may be derived. For example, in one aspect, such as in a TrigML™ document, double buffer indicator 26 may comprise a filter-like element that contains a child element, and operates to double buffer the rendering or "painting" of the child element (e.g., to improve animation performance).

Figure 4:
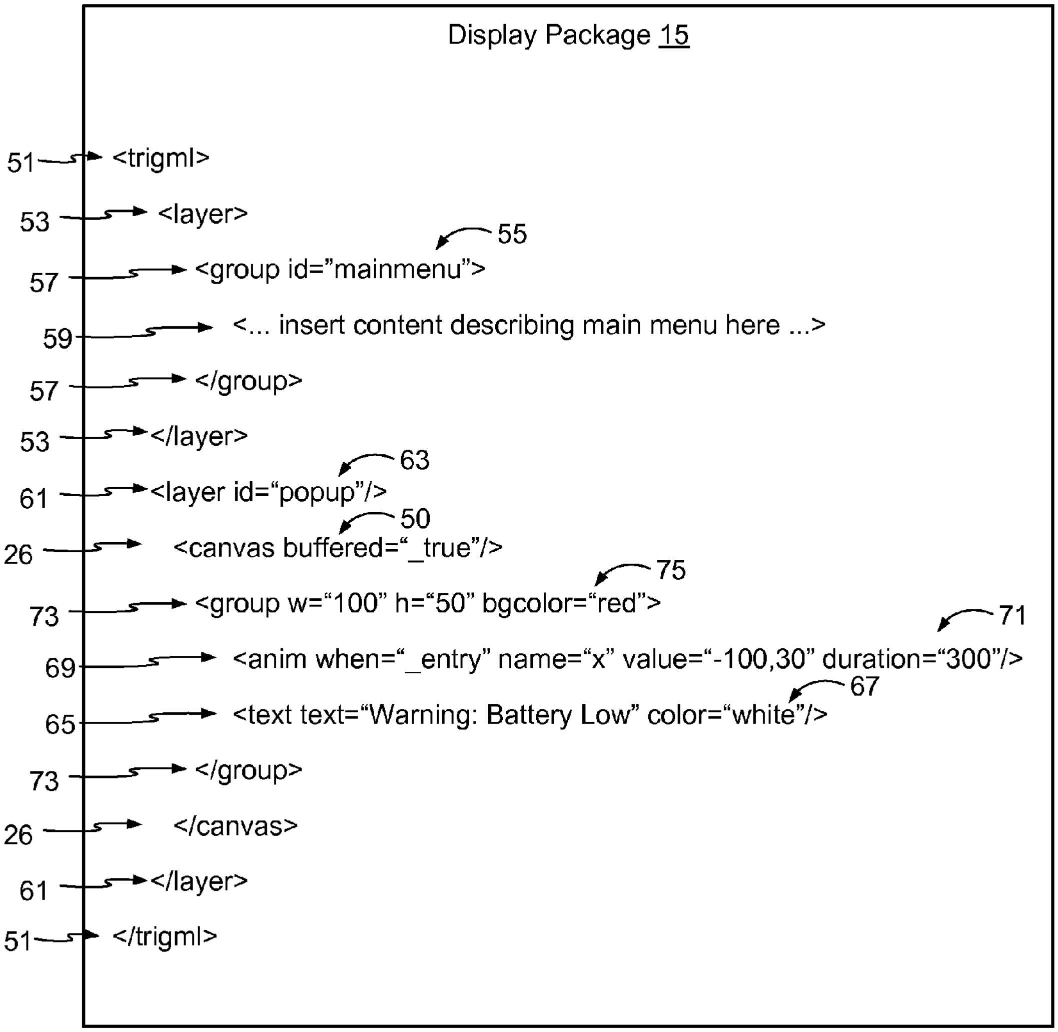
FIG. 4 is a representation of one non-limiting example of a display package utilizable within the system of FIG. 1, according to one aspect.

Referring to FIG. 4, in one non-limiting example of a display package 14 (FIG. 1) defined by a TrigML™ document 15, double buffer indicator 26 may take the form of a "<canvas>" tag. The "<canvas>" tag alludes to the fact that each selected display element group denoted by the double buffer indicator 26 respectively are "painted" into a separate "canvas" or double buffer memory area. Additionally, in one implementation, double buffer indicator 26 may further comprise a control attribute 50 having a value that may be changed to selectively enable and disable double buffering. For example, in one non-limiting aspect, control attribute 50 may have a value of "true" to enable double buffering, and a value of "false" to disable double buffering. In one aspect, the tag is left in place in case the author wants to switch on buffering later (or vice versa).

In the illustrated example, TrigML™ document 15 defines the displayable elements and/or components in "layers," thus providing a hierarchy for governing relative element and/or group characteristics. For instance, a first layer may be defined such that the first layer always overlies a second layer and a second layer may be defined such that the second layer always overlies a third layer, etc. In present example, a pair of document type tags 51 identifies the beginning and end of the respective document. In particular, the <trigml> tag 51 may be a non-visual container that defines the fragment of XML as being a TrigML™ fragment, and makes the whole fragment a single XML document. As illustrated, the beginning of tagged content is identified by the tag identifier, and the end of the tagged content is denoted by the same tag identifier preceded by a backslash, "/". A pair of first layer tags 53, and the respective contents, defines the backdrop for the present example—a main menu—as denoted by attribute 55 of the initial one of the pair of first group tags 57. In the illustrated example, the content of the main menu may comprise text, graphics, etc., as can be denoted by one or more tags, such as tag 59. In the illustrated example, tag 59 does not include a tag identifier and/or a tag attribute, but may include any type of tag having none or any combination of one or more attributes. Further, the content may be organized into one or more groups, such as the group indicated by first group tags 57.

Further depicted is a pair of second layer tags 61 defining a "popup" component, as indicated by layer attribute 63. In the illustrated example, the "popup" comprises the text message "Warning: Battery Low" in a white color, as respectively defined by text tag 65 and attribute 67. Additionally, the "popup" has an animation attached thereto, as defined by an animation tag 69 having animation attributes 71. According to animation attributes 71, the animation is triggered when the piece of content first enters the page (i.e., when the piece of content is loaded into rendering module 30 (FIG. 1)). Further, according to animation attributes 71, the animation animates the x-coordinate of the parent group of the animation, as defined by second group tags 73, from −100 millimeters (mm) to +30 mm in 300 milliseconds (ms). Parent group 73 further includes a configurable group attribute 75, which in the subject example, defines the group of display element(s) as having a width of 100 mm, a height of 50 mm, and a red background color (bgcolor). Additionally, the double buffer or <canvas> element 26, having control attribute 50 equal to "true," is operable in this case to instruct rendering module 30 (FIG. 1) to double buffer the appearance of group 73, for example, so the frames of the animation can be rendered faster. In the illustrated example, double buffering may be desired, for instance, because group 73 is only moving, e.g. changing the group 73 x-axis coordinate. That is, the group 73 contents are not changing from frame to frame.

In the example of FIG. 4, it should be noted that a plurality of display elements may be included in any group to which double buffer indicator 26 applies. Similarly, although double buffer indicator 26 in this example includes only a single group 73, it should be noted that a single element, and/or a plurality of elements, and/or a plurality of groups may be included within one double buffer indicator 26. Additionally, for example, one or more double buffer indicators 26 may be nested within another double buffer indicator 26. Furthermore, although display package 15 in the present example includes only one double buffer indicator 26, a plurality of double buffer indicators 26 may be included in any one display package.

Referring back to FIG. 1, content provider 12 may comprise one or any combination of a content provider, a content retailer, a billing and customer service provider, a network service provider, a media distributor, a content server, and any entity and/or device in or related to the chain of distribution of content and/or services to computer device 16. For example, in some aspects, content provider 12 may include the uiOne™ solution available from Qualcomm Incorporated of San Diego, Calif. uiOne™ solution operates to provide an open and flexible combination of technologies and services for operators, device manufacturers, and publishers/developers to create and deploy customized and updateable mobile UIs.

Further, for example, content provider 12 may include the deliveryOne™ content management and delivery system that operates to manage the end-to-end transfer of wireless content to an array of wireless devices. Additionally, for instance, content provider 12 may include the uiOne TrigPublisher™ and uiOne Depot™ solutions, which operate to provide services to control and refresh the user experiences through selective updates to parts of the UI. In one example, the subject solutions may further include tools for the rapid creation of a wide range of mobile user interfaces, also referred to as Trigs. For example, such tools may be used to accelerate the process by basing new designs on existing templates, which can be quickly modified, simulated, and loaded directly into the phone for testing and evaluation. The present combination of features in the subject solutions can result in high quality interfaces which create a compelling user experience. The deliveryOne™ content management and delivery system, and the uiOne TrigPublisher™ and uiOne Depot™ solutions are available from Qualcomm Incorporated of San Diego, Calif.

Additionally, communication interface 18 may comprise one or any combination of a wired connection, a wireless connection, and direct loading onto the device at the time of manufacture. The wired and/or wireless connection may further include a network, such as one or any combination of a data network and a communications network. In some aspects, for example, the network may comprise all or some portion of a multicast network such as a Forward Link Only (FLO) network, including the MediaFLO™ System available from Qualcomm Incorporated of San Diego, Calif. In one aspect, the network may include one or a combination of other networks, such as: a digital video broadcasting (DVB) network, such as DVB-S for satellite, DVB-C for cable, DVB-T for terrestrial television, DVB-H for terrestrial television for handhelds; a terrestrial telephone network; a satellite telephone network; an infrared network such as an Infrared Data Association (IrDA)-based network; a short-range wireless network; a Bluetooth® technology network; a ZigBee® protocol network; an ultra wide band (UWB) protocol network; a home radio frequency (HomeRF) network; a shared wireless access protocol (SWAP) network; a wideband network, such as a wireless Ethernet compatibility alliance (WECA) network, a wireless fidelity alliance (Wi-Fi Alliance) network, and a 802.xx network; a public switched telephone network; a public heterogeneous communications network, such as the Internet; a private communications network; and land mobile radio network.

Further, examples of telephone networks that may be included in some aspects of the network include one, or any combination, of analog and digital networks/technologies, such as: code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (iX) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a communications network and a data network.

Figure 5:
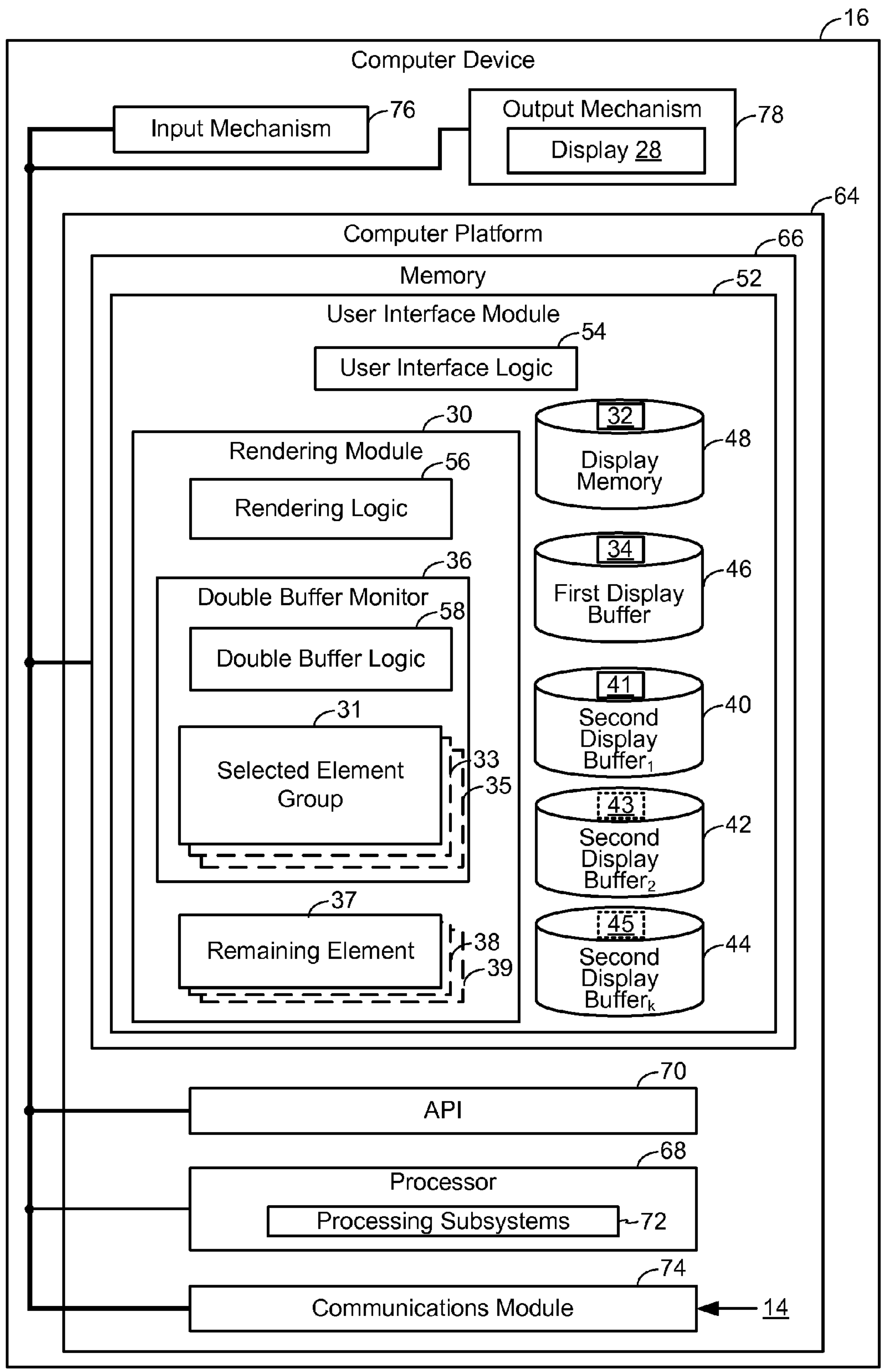
FIG. 5 is a block diagram of one aspect of a computer device of the system of FIG. 1.

Referring to FIG. 5, in one aspect, computer device 16 may include, but is not limited to, any device having a computer platform 64 comprising a memory 66 and a processor 68. It should be noted that computer device 16 may include any type of wired and/or wireless device, such as a cellular telephone, a Personal Digital Assistant (PDA), a laptop computer, a personal gaming device, a two-way pager, a portable music device, and any other type of computer.

Computer platform 64 may be operable to transmit data across a network, such as data and/or communications network, and/or to receive and/or execute routines and/or applications. Computer platform 64 may further be operable to optionally display data transmitted from any network device or other computer device connected to the network or connected to computer device 16. For example, computer platform 64 may be embodied in hardware, firmware, software, data, executable instructions, and combinations thereof.

Computer platform 64 may include memory 66, which can comprise volatile and nonvolatile memory such as read-only and/or random-access memory (RAM and ROM), electrically programmable ROM (EPROM), electrically-erasable programmable ROM (EEPROM), flash cards, or any memory common to computer platforms. Further, memory 66 may include one or more flash memory cells, or may be any secondary or tertiary storage device, such as magnetic media, optical media, tape, or soft or hard disk, including removable memory mechanisms. Additionally, as discussed previously, memory 66 may include one or any combination of display memory 48, first display buffer 46, and one or more second display buffers 41, 42, and 44, where the number of separate second display buffers may correspond to the number of separate selected element groups 31, 33 and 35 identified by double buffering module 36.

Further, computer platform 64 may include processor 68, which may be one or more of an application-specific integrated circuit (ASIC), a chipset, a processor, a logic circuit, and any other data processing device. In one aspect, processor 68, or other processor such as an ASIC, may execute an application programming interface (API) layer 70 that interfaces with any resident programs, such as a user interface module 52, rendering module 30, and double buffer module 36, stored in memory 66 of computer device 16. API 70 is typically a runtime environment executing on the respective wireless device. One such runtime environment is Binary Runtime Environment for Wireless.RTM. (BREW.RTM.) software developed by Qualcomm Incorporated of San Diego, Calif. Other runtime environments may be utilized that, for example, operate to control the execution of applications on wired and/or wireless computing devices.

Additionally, processor 68 may include various processing subsystems 72 embodied in hardware, firmware, software, data, executable instructions and combinations thereof, which enable the functionality of computer device 16 and the operability of the computer device on a data and/or communications network. For example, processing subsystems 72 may allow for initiating and maintaining communications, and exchanging data, with content provider 12 and/or other networked devices. In one aspect in which the computer device is defined as an exemplary cellular telephone, the processor 68 may additionally include one or a combination of processing subsystems 72 for communications, such as sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, vocoder, messaging, graphics, USB, multimedia, etc. For the disclosed aspects, processing subsystems 72 of processor 68 may include any subsystem components that interact with applications executing on computer platform 64 that enable the functionality described herein.

Further, computer platform 64 may include a communications module 74 embodied in hardware, firmware, software, data, executable instructions and combinations thereof, which enables communications among the various components of computer device 16, as well as between computer device 16 and communication interface 18. For example, in a cellular telephone aspect, communication module 74 may include the requisite hardware, firmware, software, data, executable instructions and combinations thereof, including transmit and receive chain components for establishing a wireless communication connection.

Further, in one aspect, for example, communication module 74 may be operable to receive and forward display package 14, or provide access to the display package 14 to at least one of user interface module 52, rendering module 30, and double buffer module 36. Subsequently, for example, communications module 74 may be operable to forward selected element group(s) 31, 33 and 35, remaining element(s) 37, 38 and 39, rendered selected element group(s) 41, 43 and 45, rendered display frame(s) 34 and 32 among the device components based on instructions from rendering module 30.

Additionally, computer device 16 may have one or more input mechanisms 76 for generating inputs into the device, and may further have one or more output mechanism 78 for generating information for consumption by the user of the device. For example, input mechanism 76 may include a mechanism such as a key or keyboard, a navigation mechanism, a mouse, a touch-screen display, a microphone in association with a voice recognition module, etc. In certain aspects, input mechanism 76 provides for user input to activate or interact with an application or module on the wireless device. Further, for example, output mechanism 78 may include display 28 operable to present a UI, an audio speaker, a haptic feedback mechanism, etc.

Additionally, computer platform 64 may further include user interface module 52 operable to manage the execution and/or operation of rendering module 30, double buffer module 36, and display mechanism 28. User interface module 52 may comprise one or any combination of hardware, software, firmware, executable instructions, and data. For example, in one aspect, user interface module 52 comprises user interface logic 54 which is executable by processor 68 to perform the user interface management functions. Further, for example, user interface module 52 may include the uiOne.TM. client and porting layer associated with the uiOne.TM. solution discussed previously. In a cell phone aspect, for example, the uiOne.TM. client is a high performance, compact application residing on the handset which allows "Trigs," or user interfaces, to be installed and updated over the air. For example, the uiOne.TM. client enables interaction between the software components of the handsets (e.g., phone, messaging, contacts, calendar, etc.) and the user interface or display mechanism 28. Further, operators can use the uiOne.TM. client to differentiate the service offering of the operators and drive revenues by branding the user interface, dynamically promoting services on the screen, and providing seamless connection, making it easier for users to buy services.

In yet another aspect, in a Trig-based system, user interface module 52 may include one or any combination of: a virtual file system; a resource manager operable to provide, among other things, an abstraction of the persistent storage on the device; a network communication agent; an update manager operable to handle the reception and application of Trigs and Triglets; an actor manager operable to look after the set of actors present in the software; a plurality of actors; a support manager operable to provide an interface for other components to report the occurrence of an event or error; and a trig manager operable to present an interface to the resource manager and the renderer, as well as other trig management functions.

Additionally, computer platform 64 may further include rendering module 30 operable to generate rendered display frames corresponding to display package 14. Rendering module 30 may comprise one or any combination of hardware, software, firmware, executable instructions, and data. For example, in one aspect, rendering module 30 comprises rendering logic 56 which is executable by processor 68 to perform the rendering functions described herein. In another aspect, rendering module 30 may comprise one or any combination of additional components, such as a parser and a rendering engine. In one implementation, the parser is operable to read the language of display package 14 while the rendering engine operable is operable to translate the parsed language into graphics API calls to perform drawing or rendering actions. Additionally, in one aspect, rendering module 30 may be operable to define a second display buffer for each selected element group as identified by double buffer module 36. Further, rendering module 30 may be operable to paint each identified selected element group into a separate respective second display buffer.

Additionally, computer platform 64 includes double buffer module 36 operable to identify, based on one or more double buffer indicators 26 within display package 14, a respective one or more selected elements/groups for double buffering. Double buffer module 36 may comprise one or any combination of hardware, software, firmware, executable instructions, and data. For example, in one aspect, double buffer module 36 comprises double buffer logic 56 executable by processor 68. The double buffer logic 56 is operable to perform the operation of identification of selected element group(s) 31, 33, and/or 35, as described herein. In this respect, double buffer logic 56 may include one or any combination of rules, functions, heuristics, neural networks, and/or any other predetermined logic operable to detect one or more double buffer indicators 26 embedded within display package 14 and/or to analyze display package 14 and one or any combination of display elements 20, 22 and 24 in order to determine and/or derive one or more double buffer indicators 26. For example, rather than detecting a predetermined or hard-coded indicator, double buffer logic 56 may be operable to analyze a sequence of display frames, identify one or more individual or groups of static display elements across at least two display frames to classify as a selected element group, optionally automatically generate double buffer indicators 26 and/or otherwise automatically identify one or more selected element groups 31, 33 and 35, and initiate the generation and storage of corresponding rendered selected element groups 41, 43 and 45 for use in the presentation of the plurality of display frames defined by display package 14. Additionally, in one aspect, double buffer module 36 may be operable to create and/or define a second display buffer for saving each selected element group, where each rendered selected element group may be saved in a separate second display buffer, or where all of the rendered selected element groups are stored to a single buffer display.

Figure 6:
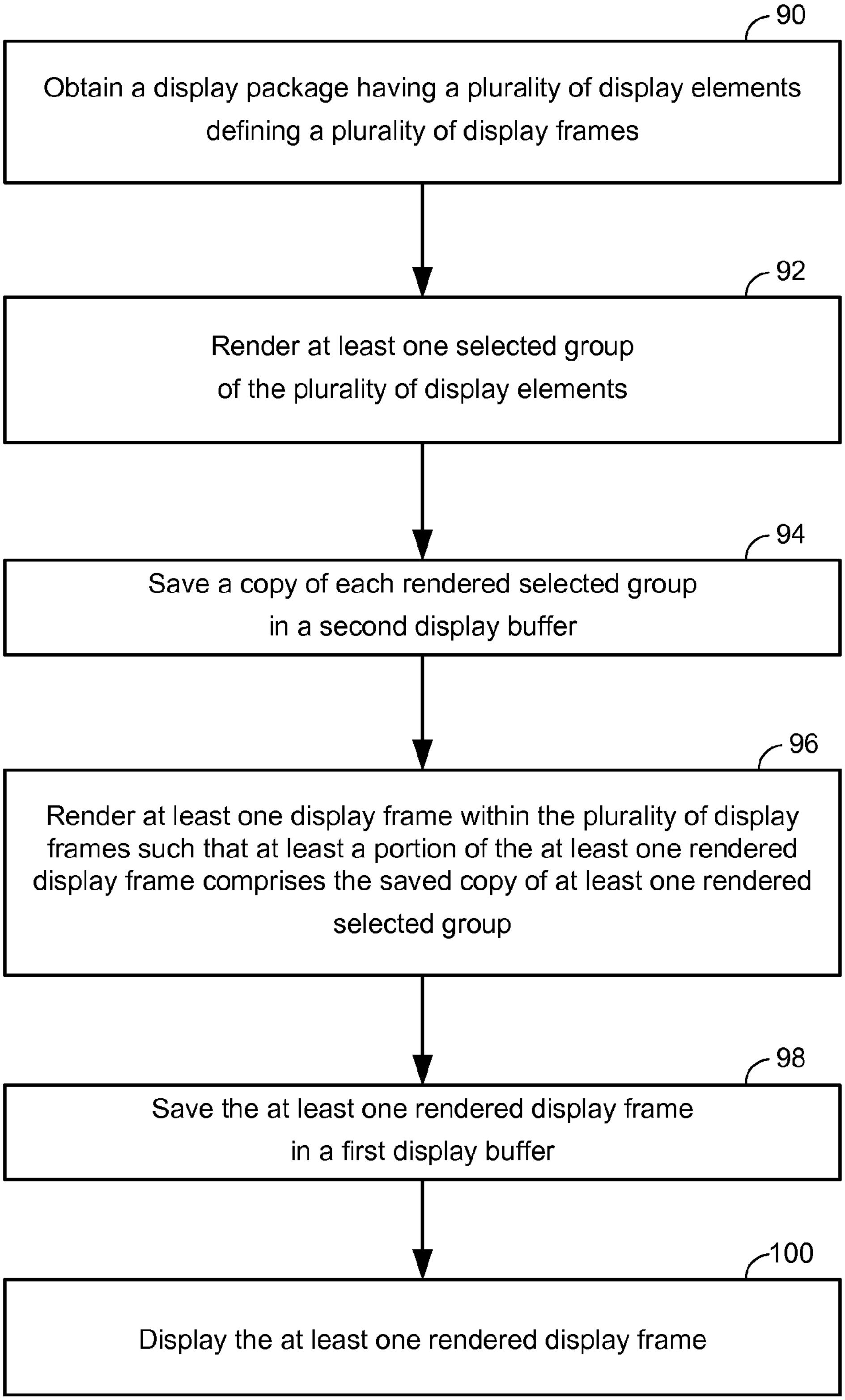
FIG. 6 is a flowchart of one aspect of a method of generating displayable content according to the system of FIG. 1.

Referring to FIG. 6, in one aspect, a method of displaying content comprises obtaining a display package having a plurality of display elements defining a plurality of display frames (Event 90). For example, in one aspect, a computer device receives a display package from a content provider via a communication interface. Display package may comprise a plurality of display elements that define a plurality of display frames, and further may include at least one double buffer indicator.

Additionally, the method may include rendering at least one selected group of the plurality of display elements (Event 92). Further, rendering at least one selected group of the plurality of display elements may include rendering one selected element, a plurality of selected elements, and/or a plurality of selected groups of elements. In one example, each selected group is based on double buffer indicator information in the display package. For example, in one aspect, responsive to the display package, a rendering module is operable to generate one or more rendered selected element groups from a respective one or more selected element groups identified by a double buffer module. For instance, in one implementation, the double buffer module may be operable to analyze the display package and locate and/or derive one or more double buffer indicators signaling content that is to be double buffered (e.g., to improve animation performance). For example, such double buffering may occur when the composition of the one or more display elements does not change across two or more display frames. It should be noted, however, that the two or more display frames may not need to be consecutive display frames. Additionally, in one aspect, each selected element group may comprise less than the entirety of a corresponding rendered display frame. Further, in one aspect, each selected group may comprise less than all of the plurality of display elements associated with the corresponding display frame.

Further, the method may include saving a copy of each rendered selected group in a second display buffer (Event 94). For example, in one aspect, the rendering module may be operable to store the one or more rendered selected element groups in a respective one or more second display buffers. In one implementation, for example, the rendering module and/ or double the buffer module may be operable to define or create the respective one or more second display buffers within a memory, for example, based on the double buffer indicator information. Although separate second display buffers may be created, it should be noted that all rendered selected element groups may be saved into a common second display buffer.

Additionally, the method may include rendering at least one display frame within the plurality of display frames such that at least a portion of the at least one rendered display frame comprises the saved copy of the rendered selected group (Event 96). For example, in one aspect, the rendering module may be operable to generate rendered display frame by rendering one or more remaining elements in combination with a copy of one or more rendered selected element groups. In another aspect, for example, the rendered display frame may be generated using only copies of two or more rendered selected element groups. As such, in one implementation, each rendered selected element groups can comprise less than the entirety of the corresponding display frame.

Further, the method may include saving the at least one rendered display frame in a first display buffer (Event 98). For example, in one aspect, the rendering module may be operable to save each respective rendered display frame into a first display buffer.

Additionally, the method may include displaying the at least one display frame (Event 100). For example, in one aspect, the rendering module may be operable to copy a respective rendered display frame from the first display buffer into a display memory, thereby causing the respective display frame to be presented on a display mechanism. Further, for example, after rendering and displaying the display frame, the rendering module may then utilize at least one of rendered selected element groups, either in combination with another one of the group and/or with one or more remaining elements, to generate the next display frame. Upon completion of the rendering of the rendered display frame, the rendering module may copy the rendered display frame to the display memory while discarding rendered display frame, and then present the rendered display frame on the display mechanism. The actions defined above may be repeated to cause the presentation of each of the plurality of display frames within the respective display package, where one or more individual or groups of static display elements are selectively rendered once, saved, and then copied into the rendering of one or more subsequent display frames. Thus, the rendering module may cause the presentation of at least rendered display frame having a portion that includes at least one previously rendered selected element group.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, in one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of generating displayable content, comprising:

obtaining a display package having a plurality of display elements defining a plurality of display frames;

selecting at least one group of the plurality of display elements for double-buffering based on indicator information contained in the display package, wherein the indicator information indicates which of the plurality of display elements are to be double buffered and wherein the at least one selected group includes less than all of the plurality of display elements;

rendering the at least one selected group of the plurality of display elements;

saving a copy of each rendered selected group in a second display buffer;

rendering at least one display frame within the plurality of display frames such that at least a portion of the at least one rendered display frame comprises the saved copy of at least one rendered selected group; and saving the at least one rendered display frame in a first display buffer, the first display buffer being different from the second display buffer.

2. The method of claim 1, further comprising displaying the at least one rendered display frame.

3. The method of claim 2, wherein displaying the at least one rendered display frame comprises copying a respective rendered display frame from the first display buffer into a display memory to cause a display of the respective rendered display frame on a display mechanism.

4. The method of claim 1, wherein rendering the at least one display frame comprises combining the saved copy of more than one rendered selected group to form an entirety of a respective display frame.

5. The method of claim 1, wherein rendering the at least one display frame comprises:

rendering selected ones of the plurality of display elements corresponding to a respective display frame; and combining the rendered selected ones of the plurality of display elements with the saved copy of at least one rendered selected group to form an entirety of the respective display frame.

6. The method of claim 1, wherein rendering at least one display frame comprises selectively rendering at least one selected group of the plurality of display elements only once during the rendering of at least two display frames.

7. The method of claim 1, wherein the selecting includes identifying a control attribute corresponding to a double buffer indicator within the indicator information of the display package, and wherein rendering the at least one selected group includes generating each respective rendered selected group in response to the identified control attribute.

8. The method of claim 1, wherein the selecting includes analyzing the display package for static ones of the plurality of display elements across the plurality of display frames, deriving the indicator information based on the static ones of the plurality of display elements, and wherein the rendering the at least one selected group includes generating each respective rendered selected group in response to the derived indicator information.

9. The method of claim 1, further comprising:

identifying static ones of the plurality of display elements across the plurality of display frames;

weighing costs and benefits of rendering and saving the copy of the identified static ones of the plurality of display elements with respect to a frame rate corresponding to the plurality of display frames; and deriving the indicator information based on a result of the weighing.

10. The method of claim 1, wherein rendering the at least one selected group of the plurality of display elements comprises rendering each selected group from less than all of the respective ones of the plurality of display elements corresponding to a respective display frame.

11. The method of claim 1, wherein the display package defines the plurality of display elements corresponding to a respective display frame in a plurality of layers, and wherein rendering the at least one selected group of the plurality of display elements comprises rendering at least one of the plurality of layers.

12. The method of claim 1, wherein saving the copy of each rendered selected group in the second display buffer comprises saving each respective rendered selected group in a different corresponding one of a plurality of second display buffers.

13. The method of claim 12, wherein rendering the at least one display frame further comprises copying more than one rendered selected group from the respective corresponding ones of the plurality of second display buffers into the first display buffer to form a respective rendered display frame.

14. The method of claim 13, further comprising copying each respective rendered display frame from the first display buffer to a display memory to cause a display of the respective rendered display frame on a display mechanism.

15. The method of claim 1, wherein obtaining the display package comprises obtaining at least a non-compiled data file, a compiled data file, or a programming language.

16. The method of claim 1, wherein the display package further comprises a user interface configured for presentation on a computer device having a predetermined display characteristic, a predetermined amount of memory and a predetermined amount of processing power, and wherein rendering the at least one display frame comprises rendering the user interface.

17. The method of claim 1, wherein the indicator information contained in the display package corresponds to a bit configuration that explicitly indicates whether one or more of the plurality of display elements are to be double-buffered.

18. The method of claim 17, wherein the indicator information contained in the display package corresponds to a tag, a command, a marker and/or a combination thereof.

19. The method of claim 1, wherein the indicator information contained in the display package is inserted into the display package by an author of the display package.

20. At least one processor configured to generate displayable content, comprising:

a module operable to obtain a display package having a plurality of display elements defining a plurality of display frames;

a module operable to select at least one group of the plurality of display elements for double-buffering based on indicator information contained in the display package, wherein the indicator information indicates which of the plurality of display elements are to be double buffered and wherein the at least one selected group includes less than all of the plurality of display elements;

a module operable to render the at least one selected group of the plurality of display elements;

a module operable to save a copy of each rendered selected group in a second display buffer;

a module operable to render at least one display frame within the plurality of display frames such that at least a portion of the at least one rendered display frame comprises the saved copy of at least one rendered selected group; and a module operable to save the at least one rendered display frame in a first display buffer, the first display buffer being different from the second display buffer.

21. The at least one processor of claim 20, wherein the module operable to render the at least one display frame comprises a module operable to combine the saved copy of more than one rendered selected group to form an entirety of a respective display frame.

22. The at least one processor of claim 20, wherein the module operable to render the at least one display frame comprises:

a module operable to render selected ones of the plurality of display elements corresponding to a respective display frame; and a module operable to combine the rendered selected ones of the plurality of display elements with the saved copy of at least one rendered selected group to form an entirety of the respective display frame.

23. The at least one processor of claim 20, wherein the module operable to render the at least one display frame comprises:

a module operable to selectively render at least one selected group of the plurality of display elements only once during the rendering of at least two display frames.

24. The at least one processor of claim 20, wherein the module operable to select comprises:

a module operable to identify a control attribute corresponding to a double buffer indicator within the indicator information of the display package; and a module operable to identify each respective rendered selected group in response to the identified control attribute.

25. A non-transitory computer-readable medium containing instructions stored thereon, which, when executed by at least one processor, cause the at least one processor to perform operations, the instructions comprising:

at least one instruction for causing a computer to obtain a display package having a plurality of display elements defining a plurality of display frames;

at least one instruction for selecting at least one group of the plurality of display elements for double-buffering based on indicator information contained in the display package, wherein the indicator information indicates which of the plurality of display elements are to be double buffered and wherein the at least one selected group includes less than all of the plurality of display elements;

at least one instruction for causing the computer to render the at least one selected group of the plurality of display elements;

at least one instruction for causing the computer to save a copy of each rendered selected group in a second display buffer;

at least one instruction for causing the computer to render at least one display frame within the plurality of display frames such that at least a portion of the at least one rendered display frame comprises the saved copy of at least one rendered selected group; and at least one instruction for causing the computer to save the at least one rendered display frame in a first display buffer, the first display buffer being different from the second display buffer.

26. The non-transitory computer-readable medium of claim 25, wherein the at least one instruction for causing the computer to render the at least one display frame comprises:

at least one instruction for causing the computer to combine the saved copy of more than one rendered selected group to form an entirety of a respective display frame.

27. The non-transitory computer-readable medium of claim 25, wherein the at least one instruction for causing the computer to render the at least one display frame comprises:

at least one instruction for causing the computer to render selected ones of the plurality of display elements corresponding to a respective display frame; and at least one instruction for causing the computer to combine the rendered selected ones of the plurality of display elements with the saved copy of at least one rendered selected group to form an entirety of the respective display frame.

28. The non-transitory computer-readable medium of claim 25, wherein the at least one instruction for causing the computer to render the at least one display frame comprises:

at least one instruction for causing the computer to selectively render at least one selected group of the plurality of display elements only once during the rendering of at least two display frames.

29. The non-transitory computer-readable medium of claim 25, wherein the at least one instruction for causing the computer to select comprises:

at least one instruction for causing the computer to identify a control attribute corresponding to a double buffer indicator within the indicator information of the display package; and at least one instruction for causing the computer to identify each respective rendered selected group in response to the identified control attribute.

30. An apparatus, comprising:

means for obtaining a display package having a plurality of display elements defining a plurality of display frames;

means for selecting at least one group of the plurality of display elements for double-buffering based on indicator information contained in the display package, wherein the indicator information indicates which of the plurality of display elements are to be double buffered and wherein the at least one selected group includes less than all of the plurality of display elements;

means for rendering the at least one selected group of the plurality of display elements;

means for saving a copy of each rendered selected group in a second display buffer;

means for rendering at least one display frame within the plurality of display frames such that at least a portion of the at least one rendered display frame comprises the saved copy of at least one rendered selected group; and means for saving the at least one rendered display frame in a first display buffer, the first display buffer being different from the second display buffer.

31. The apparatus of claim 30, wherein the means for rendering the at least one display frame comprises means for combining the saved copy of more than one rendered selected group to form an entirety of a respective display frame.

32. The apparatus of claim 30, wherein the means for rendering the at least one display frame comprises:

means for rendering selected ones of the plurality of display elements corresponding to a respective display frame; and means for combining the rendered selected ones of the plurality of display elements with the saved copy of at least one rendered selected group to form an entirety of the respective display frame.

33. The apparatus of claim 30, wherein the means for rendering the at least one display frame comprises:

means for selectively rendering at least one selected group of the plurality of display elements only once during the rendering of at least two display frames.

34. The apparatus of claim 30, wherein the means for selecting comprises:

means for identifying a control attribute corresponding to a double buffer indicator within the indicator information of the display package; and means for identifying each respective rendered selected group in response to the identified control attribute.

35. A computer device for generating displayable content, comprising:

a memory comprising a first display buffer, a second display buffer different from the first display buffer, and a display package, wherein the display package comprises a plurality of display elements defining a plurality of display frames;

a processor in communication with the memory;

a rendering module having rendering logic, wherein the rendering module is executable by the processor to select at least one group of the plurality of display elements for double-buffering based on indicator information contained in the display package, wherein the indicator information indicates which of the plurality of display elements are to be double buffered and wherein the at least one selected group includes less than all of the plurality of display elements, and further to render the at least one selected group of the plurality of display elements;

wherein the rendering module is further executable by the processor to save a copy of each rendered selected group in the second display buffer;

wherein the rendering module is further executable by the processor to render at least one display frame within the plurality of display frames such that at least a portion of the at least one rendered display frame comprises the saved copy of at least one rendered selected group; and wherein the rendering module is further executable by the processor to save the at least one rendered display frame in the first display buffer.

36. The computer device of claim 35, further comprising a display mechanism, wherein the memory further comprises a display memory in communication with the display mechanism, and wherein the rendering module is further executable by the processor to copy each rendered display frame from the first display buffer to the display memory to display the display frame on the display mechanism.

37. The computer device of claim 35, wherein the rendering module is further executable by the processor to combine the saved copy of more than one rendered selected group to form an entirety of a respective display frame.

38. The computer device of claim 35, wherein the rendering module is further executable by the processor to render selected ones of the plurality of display elements corresponding to a respective display frame, and combine the rendered selected ones of the plurality of display elements with the saved copy of at least one rendered selected group to form an entirety of the respective display frame.

39. The computer device of claim 35, wherein the rendering module is further executable by the processor to selectively render only once at least one selected group of the plurality of display elements during the rendering of at least two display frames.

40. The computer device of claim 35, wherein the indicator information comprises at least one double buffer indicator having a control attribute indicating whether or not to implement double buffering, wherein the rendering module further comprises a double buffer module having double buffer logic executable by the processor to identify each double buffer indicator and each corresponding control attribute, and wherein the double buffer module is further executable by the processor to initiate generation of a respective rendered selected group in response to identifying a respective control attribute indicating implementation of double buffering.

41. The computer device of claim 35, wherein the rendering module further comprises a double buffer module having double buffer logic executable by the processor to:

analyze the display package for static ones of the plurality of display elements across the plurality of display frames;

derive the indicator information based on the static ones of the plurality of display elements; and generate each respective rendered selected group in response to the derived indicator information.

42. The computer device of claim 35, wherein the rendering module further comprises logic executable by the processor to:

identify static ones of the plurality of display elements across the plurality of display frames;

weigh costs and benefits of rendering and saving the copy of the identified static ones of the plurality of display elements with respect to a frame rate corresponding to the plurality of display frames; and derive the indicator information based on a result of the weighing.

43. The computer device of claim 35, wherein the rendering module is further executable by the processor to render each selected group from less than all of the respective ones of the plurality of display elements corresponding to a respective display frame.

44. The computer device of claim 35, wherein the display package defines the plurality of display elements corresponding to a respective display frame in a plurality of layers, and wherein the at least one selected group of the plurality of display elements correspond to at least one of the plurality of layers.

45. The computer device of claim 35, wherein the memory further comprises a plurality of different second display buffers each corresponding to a respective rendered selected group, and wherein the rendering module is further executable by the processor to save each respective rendered selected group in the corresponding one of the plurality of different second display buffers.

46. The computer device of claim 45, wherein the rendering module is further executable by the processor to copy more than one rendered selected group from the respective corresponding ones of the plurality of different second display buffers into the first display buffer to form a respective rendered display frame.

47. The computer device of claim 46, further comprising a display memory in communication with a display mechanism, wherein the rendering module is further executable by the processor to copy each respective rendered display frame from the first display buffer to the display memory to cause a display of the respective rendered display frame on the display mechanism.

48. The computer device of claim 35, wherein the display package further comprises at least a non-compiled data file, a compiled data file, or a programming language.

49. The computer device of claim 35, further comprising a display mechanism having a predetermined display characteristic, wherein the memory further comprises a predetermined amount of memory, wherein the processor comprises a predetermined amount of processing power, wherein the display package further comprises a user interface configured for presentation based on at least the predetermined display characteristic, the predetermined amount of memory, or the predetermined amount of processing power, and wherein the rendering module is further executable by the processor to display at least one display frame comprising the user interface on the display mechanism.

* * * * *